(12) United States Patent
Ockenfuss et al.

(10) Patent No.: US 6,785,052 B2
(45) Date of Patent: Aug. 31, 2004

(54) STRESS FREE AND THERMALLY STABILIZED DIELECTRIC FIBER

(75) Inventors: Georg Ockenfuss, Santa Rosa, CA (US); Robert E. Klinger, Rohnert Park, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/004,142

(22) Filed: Nov. 14, 2001

(65) Prior Publication Data

US 2002/0171936 A1 Nov. 21, 2002

Related U.S. Application Data

(60) Provisional application No. 60/291,986, filed on May 21, 2001.

(51) Int. Cl.[7] ................................................ G02B 5/28
(52) U.S. Cl. ........................ 359/589; 359/580; 359/577
(58) Field of Search ................................ 359/577, 580, 359/586, 588, 589, 260, 261; 356/519; 372/103, 98, 92, 107

(56) References Cited

U.S. PATENT DOCUMENTS

| | | | | |
|---|---|---|---|---|
| 4,097,126 A | * | 6/1978 | Mahlein et al. | 359/847 |
| 4,373,775 A | * | 2/1983 | Gasparian | 385/47 |
| 4,434,010 A | * | 2/1984 | Ash | 106/415 |
| 4,826,553 A | * | 5/1989 | Armitage et al. | 156/233 |
| 4,870,648 A | * | 9/1989 | Ceglio et al. | 372/5 |
| 5,080,739 A | * | 1/1992 | Fernandez et al. | 156/155 |
| 5,160,668 A | * | 11/1992 | Imus | 264/1.7 |
| 5,212,584 A | * | 5/1993 | Chung | 359/260 |
| 5,241,417 A | * | 8/1993 | Sekiguchi | 359/586 |
| 5,416,867 A | * | 5/1995 | Thorsten et al. | 385/73 |
| 5,441,803 A | * | 8/1995 | Meissner | 428/220 |
| 5,485,540 A | * | 1/1996 | Eda | 385/129 |
| 5,724,376 A | * | 3/1998 | Kish et al. | 372/96 |
| 5,751,487 A | * | 5/1998 | Someno | 359/589 |
| 5,753,023 A | * | 5/1998 | Bishop | 106/415 |
| 5,795,649 A | * | 8/1998 | Cosentino et al. | 428/336 |
| 5,846,638 A | * | 12/1998 | Meissner | 428/220 |
| 5,930,046 A | * | 7/1999 | Solberg et al. | 359/580 |
| 5,944,964 A | * | 8/1999 | Solberg et al. | 204/192.26 |
| 5,982,488 A | * | 11/1999 | Shirasaki | 356/519 |
| 5,985,686 A | * | 11/1999 | Jayaraman | 438/32 |
| 6,278,549 B1 | * | 8/2001 | Gaebe | 359/584 |
| 6,303,383 B1 | * | 10/2001 | Nakamura et al. | 435/477 |
| 6,304,383 B1 | * | 10/2001 | DeBoynton et al. | 359/579 |
| 6,320,996 B1 | * | 11/2001 | Scobey et al. | 385/18 |
| 6,469,847 B1 | * | 10/2002 | Fan et al. | 359/885 |

FOREIGN PATENT DOCUMENTS

DE           4124937 A1  *  3/1992  ........... C23C/14/08

OTHER PUBLICATIONS

Schmidt et al., "Evaporative Coatings, 'Backward' approach solves an impossible problem", Photonics Spectra, May 1995, pp. 126–128.*

Takahashi, "Temperature stability of thin–film narrow–bandpass filters produced by ion–assisted deposition", Appl. Opt., vol. 34, No. 4, 199, pp. 667–675.*

WO/0039626, Scobey et al., Jul. 6, 2000.*

* cited by examiner

*Primary Examiner*—Thong Nguyen
*Assistant Examiner*—Arnel C. Lavarias (57) ABSTRACT

A multilayer optical interference filter having a multiplicity of optical cavities separated by a dielectric reflector stacks to achieve either a very narrow passband region or sharp transition between the passband and reflective region is substantially free of stress to preserve the desired optical performance upon fabrication into miniature discrete filter elements. The substantial stress reduction is achieved by removing the filter from the substrate used in the deposition process in a controlled manner to preserve the structural integrity of the resulting free standing multilayer film structure. The structure can be further bonded or attached to other optical components to suppress a thermal shift in center wavelength without reintroducing stress or interposing a massive substrate in the optical path through the filter.

9 Claims, 6 Drawing Sheets

STRESS FREE AND THERMALLY STABILIZED DIELECTRIC FIBER

CROSS-REFERENCE TO RELATED APPLICATIONS

The present application claims priority to provisional patent application having Ser. No. 60/291,986, filed on May 21, 2001 and entitled, "Ultra-Low Stress/Free Standing WDM Type Filters", which is incorporated herein by reference.

BACKGROUND OF INVENTION

The field of the invention is multilayer optical interference filters and devices comprising the same, particularly as useful in optical communication networks.

The use of multilayer optical interference filters has become ubiquitous in optical communication systems using wavelength division multiplexing (WDM). Such filters are the currently preferred method of separating or combining optical signal channels assigned to different wavelengths, according to the ITU grid, but propagating in common waveguides due to the minimum of insertion losses. However, the need to increase the number of signal channels that can be utilized within an existing optical fiber structure requires a decrease in wavelength spacing between adjacent channels. At the same time it is desirable to decrease the physical dimensions of active and passive components, such as filters within the switching fabric, as well as to decrease the component cost by integration of filters with other components. Accordingly, the performance requirements of optical interference filters have become more demanding. While the optical performance requirements can be met by increasing the number of layers, the physical properties of such thicker filters present significant challenges to reductions of the physical dimensions and integration with other optical components.

Another requirement of such filters is that the optical performance, that is the transmission characteristics as a function of wavelength, should not change over a large range of ambient temperatures. The thermal stability is characterized by the shift of the position of the maximum transmission region, or central wavelength position, and is less than 2 picometer (pm)/° C. over the temperature range from 0° C. to 70° C.; preferably with a center wavelength (CWL) shift of less than about 0.5 pm/° C. over the above temperature range.

The deposition of optical thin film materials onto a substrate to form an optical interference filter inevitably results in a net residual stress state in the multilayer structure. The residual stress may be intrinsic, that is an inherent property of materials as deposited in the form of a thin film.

Another source of residual stress is referred to as extrinsic, and results from the difference in thermal expansion coefficient between the substrate and thin film materials. The inherent properties of useful optical materials as deposited in multilayer thin films inevitably results in a residual stress state. As additional layers are added to increase the optical performance of the films, the net residual stress effect is increased flexure of the film and substrate, as the bending moment is the product of the thickness and stress. The residual stress presents limitations on the substrate that can be used. The substrate must be sufficiently thick to avoid its flexural deformation by the residual stress in the thin film layers.

Simply increasing the substrate thickness to minimize the peripheral deformation is unacceptable for a number of reasons;

The use of thicker substrates hinders reliable and efficient fabrication into smaller devices as well as the ability to integrate the filters with other active or passive optical components. Depending on the substrate optical properties, it also adds insertion loss. Stress induced limitations include, but are not limited to: bending of the filter resulting in defocus effects, especially in the reflected, or express signal; stress induced birefringence in the coating producing polarization dispersion loss (PDL) and position sensitive CWL variability.

Residual stress can also be a factor in device failure, and may prove to be a limitation to further increases in the signal power density, such as may be achieved through future developments in laser transmitters.

The importance of substrate selection in the thermal stability of interference filters is known. The linear coefficient of expansion of the substrate material may be chosen to either shift or stabilize the center wavelength multilayer dielectric bandpass filter with respect to a changing ambient temperature, as demonstrated by H. Takahashi in Applied Optics 34(4) pp. 667–675, 1995 (misspelled Takashashi in the original publication).

Since circa 1995, numerous high thermal expansion glass and glass/ceramic material formulations either have been adapted from other applications or specifically developed for commercial use as optical quality substrate materials. Representative commercial products for different types of glasses are:

i) "F7", and "DWDM-12" by Schott Glass Technologies.
ii) "WMS-01", "WMS-02" by Ohara Glass Company.
iii) "WMS-1", "WMS-12" and "WMS-13" from Ohara Glass Company, among others.

The first four of these grades, groups i) and ii), are true glasses and owe their high coefficient of linear expansion in large part to their alloying composition, which includes a large fraction of alkali oxides. These alkali constituents unfortunately also degrade the environmental stability of the glass. Such instability can have serious deleterious effects on final device environmental performance.

The grades in group (iii), are representative of glass/ceramic composite structure, "WMS-11", "WMS-12" and "WMS-13" are three such glasses. By proper choice of materials and processing conditions, substrates can be fabricated with the requisite high expansion coefficient. Such materials do not employ alkali constituents to attain their high expansion properties to the degree, as do more conventional glasses, and thus may be more environmentally stable. These materials also have the advantage of being generally stiffer, thus allowing them to better support the high stresses imposed by the thin film structures. However, their mixed glass/ceramic nature reduces their overall transmission, as the interfaces between the phases scatter visual and infrared light. Simple coatings have been removed from their substrate to form pigments with unique optical properties. In U.S. Pat. No. 4,434,010 (Ash et al.) removed a metal/dielectric filter from its carrier substrate, formed it into small flakes and demonstrated its use as a variable color reflective pigment material. Many other such examples abound. However, Ash discloses that the optical properties of the coatings are degraded, suggesting the method is only applicable for low performance applications.

Likewise, in U.S. Pat. No. 4,826,553 (Armitage et al.) invented a method for removing a mirror coating from its substrate and re-applying it wholly intact onto a second substrate in order to alter the dielectric mirror's figure (curvature). In a later publication, Schmidt, et al (Photonic Spectra, May 1995) stated that such a method is applicable to lower performance telecommunication filters.

Solberg at al. in U.S. Pat. Nos. 5,944,964 and 5,930,046 teach a method of reducing stress by inducing crystallization of a high refractive index material to balance the compressive stress of silica. Two common high refractive index oxide materials are titania (titanium oxide) and zirconia (zirconium oxide). A common technique to densify and stabilize titania and zirconia thin film layers involves a post-deposition annealing process. Because the thin film layers are constrained by the substrate, which does not shrink the volume change from densification produces a tensile stress within the film layers. Indeed, the integrated tensile stress may exceed the integrated compressive stress of silica resulting in multilayer thin film stacks having an excessive net tensile stress also resulting in loss of mechanical integrity or poor optical performance. In addition, the crystallization that occurs during annealing may contribute to increased optical scatter, which also degrades optical performance.

The process combination taught by Solberg minimizes many of the detrimental effects of crystallization to exploit it as a means for reducing net stress arising from the thin film deposition conditions. Unfortunately, the method is inapplicable to band pass filters used in WDM filters as the crystallization process invariably introduces scatter and stress birefringence, thus lowering transmission and increasing PDL.

Another requirement of WDM filters is that the optical performance, that is the transmission characteristics as a function of wavelength, should be spatially uniform over the region illuminated by the optical signal beam. Having discovered that higher performance WDM filters exhibit a strong spatial non-uniformity in transmission at the peripheral regions, this non-uniformity has heretofore proved a limitation in the miniaturization of filters for advanced packaging applications. Although it might be highly desirable in some instances to reduce the filter to not much larger that an optical beam size of less than about 500 microns, attempting to do so would otherwise degrades the device performance. Unless the spatial non-uniformity at the edges is somehow corrected, the optical signal channels in the beam will be moderated according to the average filter performance over the area the beam illuminates.

Accordingly, there is a need for optical multilayer thin film filters that have stable wavelength transmission characteristics over a broad range of ambient temperatures, having high transmission at the center wavelength, exhibiting low scatter to minimize insertion loss as well as low polarization dispersion loss (PDL)

There is a corresponding need for reducing the physical dimensions of such optical interference filters such that they can be integrated with other passive and active optical compounds such as lenses, switches, lasers, modulators, photodetectors and the like. Accordingly, another object of the invention was to discover and eliminate the source of this non-uniformity in WDM filters. Having determined that the spatial non-uniformity correlates with residual stress, yet another object of the invention has been to preserve the properties of such optical interference filters that make them desirable for WDM applications, while substantially reducing the residual stress.

BRIEF SUMMARY OF THE INVENTION

Not wishing to be bound by theory, we have discovered that very thick multiple layer optical interference filters have a spatial non-uniformity in transmission that correlates with the high residual stress. This non-uniformity proved a limitation in the miniaturization of filters for advanced packaging applications, as it manifests itself at the peripheral regions of the filters. Thus attempting to miniaturize such filter to accommodate a small optical beam results in spatial variations within the beam area.

In one embodiment of the invention a freestanding optical filter is formed by first depositing a sequence of thin film layers on a first substrate. Subsequent removal of the thin film layers from this first substrate as a monolithic element relieves the residual stress therein This embodiment proved enabling for further miniaturization of the optical filter components.

The release of the optical coating from its substrate provided several benefits, as the substrate formerly had introduced losses and/or aberrations of the light beam. While such a free standing filter suffered from reduced thermal stability, another aspect of the invention is reattachment to a second substrate so that such smaller filters would exhibit both thermal and spatial uniformity of transmission and reflection over a larger region of the device. The second substrate and its method of attachment provide a means to thermally stabilize the filter.

In yet another aspect of the invention a subassembly in which the optical path through the multilayer dielectric interference filter is free of an intervening second substrate, yet provides a center shift of less than 2 pm/° C. over the temperature range from 0° C. to 70° C. In this embodiment the second substrate is a frame or annulus having an opening that defines an optical aperture. Thus, a portion of the multilayer dielectric interference filter is unsupported over this optical aperture. The frame is selected to provide the thermal stabilization of the center wavelength position.

BRIEF DESCRIPTION OF THE DRAWINGS

These and other features, aspects, and advantages of the present invention will become better understood with regard to the following description, appended claims, and the accompanying drawings where:

DETAILED DESCRIPTION OF THE INVENTION

Stresses in a thin film can have several components. Intrinsic stresses develop as a thin film grows during deposition owing to the specific microstructure formed therein. Another significant source of stress is due to the differences in the coefficient of thermal expansion of the film and that of the substrate or adjacent film layers causing the different materials to experience different degrees-of expansion and shrinkage upon, respectively, heating and cooling. Because typical deposition temperatures are higher than ambient temperatures, stress develops when the temperature changes from the deposition temperature. Even when films are deposited nominally at room temperature, some heating of the substrate can occur during the deposition and condensation process. Finally, temperature variations during use may lead to changes in the stress level. The sign of the thermally induced stress can change from tensile to compressive, or vice versa, as it is a function of the differences in the thermal expansion coefficients of the film and substrate materials. Thus, many factors affect the overall net stress of an optical coating.

Multilayer thin film stacks comprising alternating layers of high refractive index oxide material and low refractive index oxide material are the preferred materials for optical coatings or filters. The deposition of materials to form dense optical thin film layers, necessary for environmentally stable optical filters, results in intrinsic compressive stress. Excessive stress in an optical coating can result in cracking or delamination of the coating or optical distortions due to bending or warping of the substrate. Thus, for particularly thick optical coatings, i.e., coatings greater than about 20 mm (20,000 nm), the compressive stress of the layers can be excessive for the desired WDM applications.

Optical coatings having net tensile stress produce concave net curvature of the substrate whereas coatings in compressive stress produce convex net curvature. For this reason, net film stress in the filter may be approximated from measurements of the net curvature of the coated substrate, i.e., and the difference in curvature from the bare substrate. For example, one method for evaluating net curvature is to measure the number of fringes at a selected wavelength with an interferometer and converting the information into a stress value. Conventional knowledge maintains that optical coatings comprising a substrate having multilayer optical coatings comprising alternating layers of silica and high refractive index metal oxide material deposited thereon will generally have some net stress, either compressive or tensile depending on preparation technique and the specific alternating materials. While the net stress within a thin film material is a function of deposition method, deposited methods such as sputtering or ion assisted evaporative deposition are preferred for narrow band pass filters as the resulting coatings are dense and stable to changes in the ambient conditions. However, such dense coatings having alternating layers of silica and a high refractive index metal oxide have typically had compressive stresses in excess of $100 \times 10^6$ Pa (N/m$^2$), or 100 MPa.

Prior to the instant invention filters having a physical thickness greater than about 40 microns have been very difficult to employ as actual devices. In such designs, the internal stress in the dielectric layers distorts the substrate to an extent such that potential signal power is lost or dissipated, as measured by increasing device insertion loss. The high stress also makes further fabrication into smaller or thinner filter components extremely difficult, as the stresses can actually exceed the rupture strength of the substrate.

A further limitation occurs even after successful fabrication of the substrate and filter to final size; the stress variation arising from the free edges of the small filters extends across the entire surface of the device with the resulting distortion unacceptably narrowing the transmitted and reflected passband region.

Figure 1:
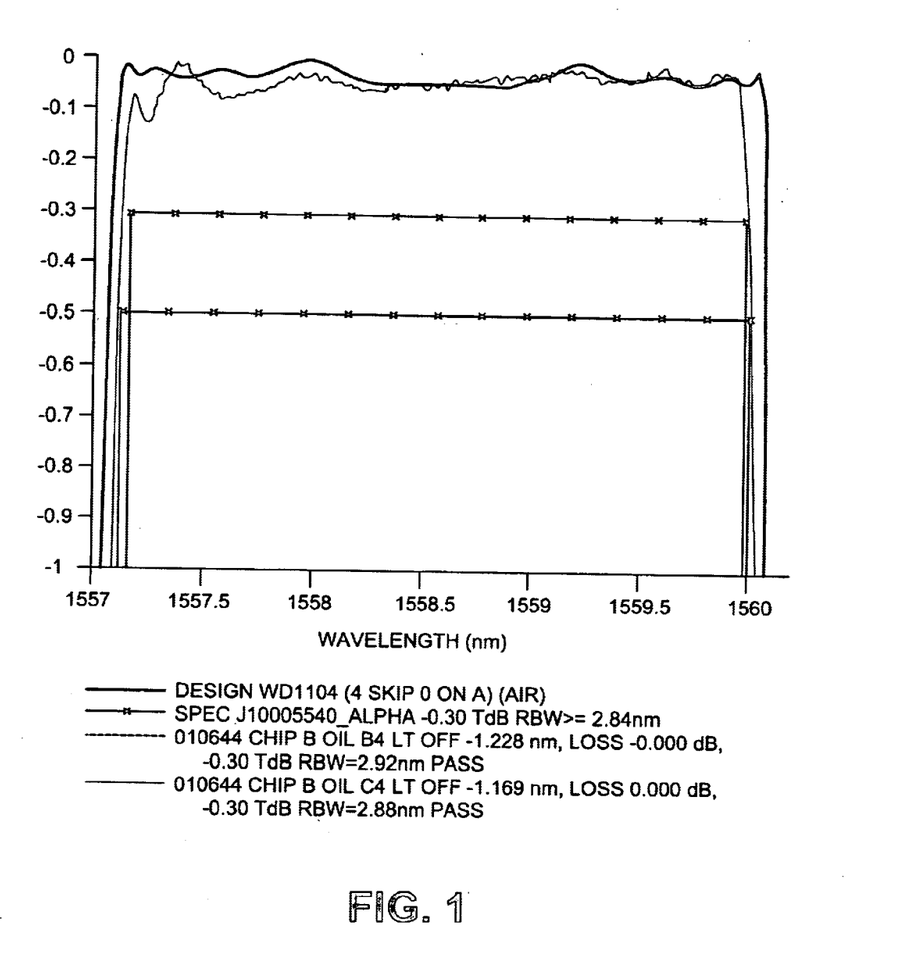
FIG. 1 is a plot of the transmission of a "4-skip-0" type bandpass filter as deposited on a 6 inch diameter substrate 10 mm thick.
Figure 2:
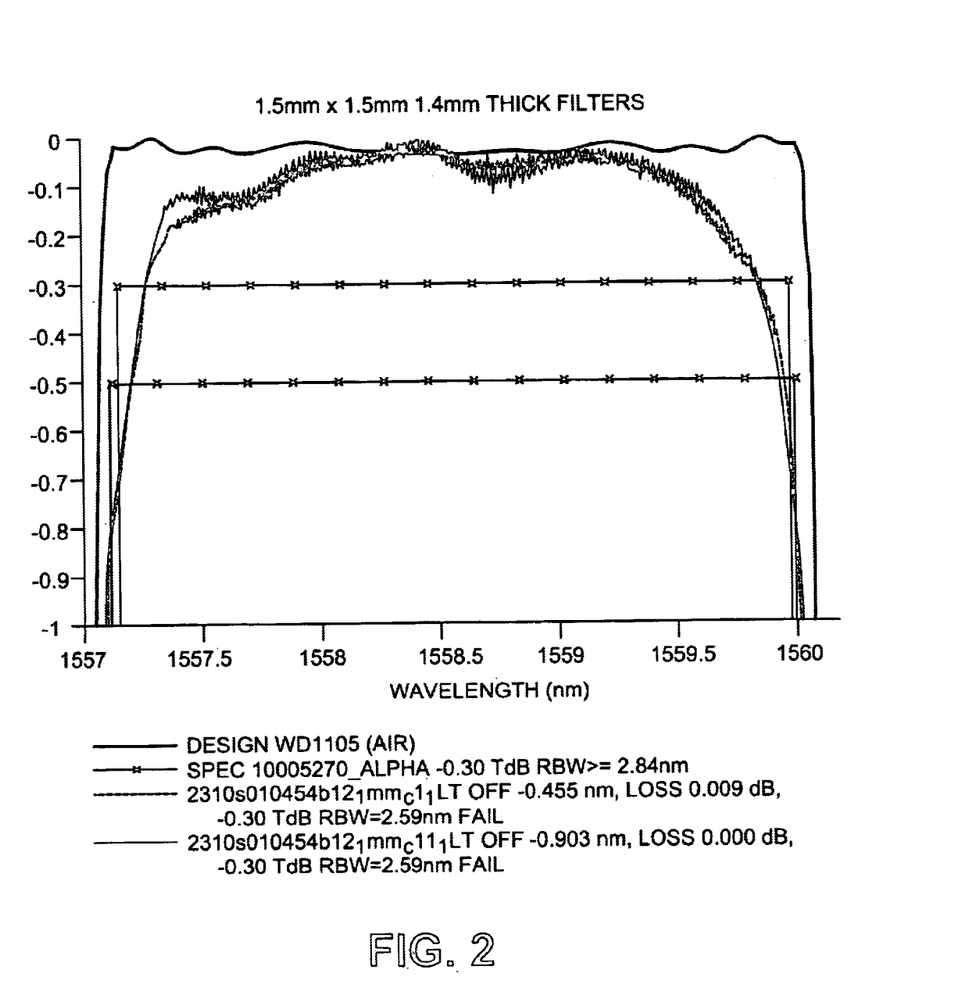
FIG. 2 is a plot of the transmission of a "4-skip-0" type bandpass filter in FIG. 1 after the 6 inch diameter substrate is fabricated into smaller, 1.5 mm square substrate that is 1.4 mm thick.
Figure 3:
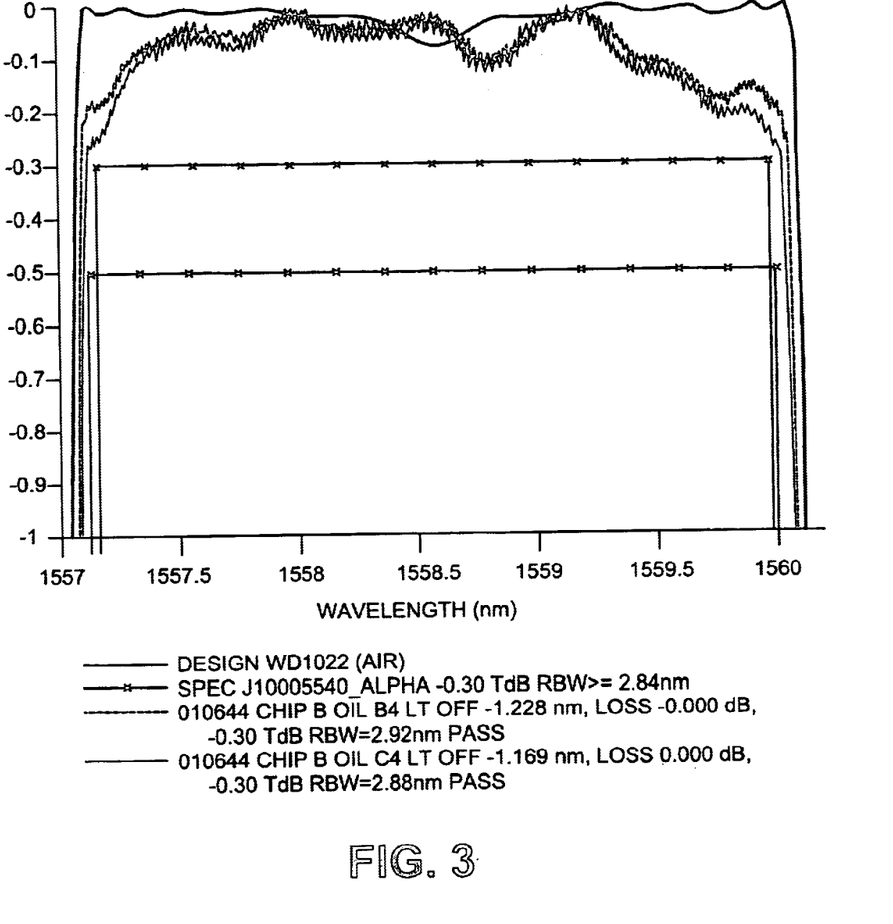
FIG. 3 is a plot of the transmission of a "4-skip-0" type bandpass filter in FIG. 1 after the thin film layers are first removed, forming a free standing optical filter, and then reattached by optical contacting to a 1.5 mm square substrate that is 1 mm thick.

This limitation is illustrated in FIGS. 1, 2 and 3 by a very high performance WDM filter donated as a "4-skip-0" design. The design results in a wavelength range of high transmission, a so-called "passband" where four (4) optical signal channels separated in wavelength by 100 GHz are to be transmitted. Outside of the passband region the next immediately adjacent optical channel is reflected due to the square edge and very steep slope of the transmission function between the adjacent 100 GHz. spaced channels, thus none or "zero" (0) channels are skipped from transmission or rejection by the filter.

FIG. 1 is the transmission of the filter as a function of wavelength measured after deposition onto the original 6-inch diameter substrate, which is 10 mm thick. The actual transmission is close to the theoretical performance derived by calculation from the optical design parameters.

FIG. 2 is the transmission of a 1.5-mm square filter fabricated from the 6-inch diameter substrate where the substrate thickness has been reduced from 10 mm to 1.4 mm. The high net stress distorts the optical filter transmission function from the ideal square shape at the edge of the passband region, progressively rounding the edge as the filter size is reduced. This 4-skip-0design is only marginally acceptable in a 2-mm square filter, thus limiting its applications to relatively massive devices. While the shape of a filter can theoretically can be arbitrarily refined with the addition of more layers this is counterproductive as merely adding additional layers further increases the stress thus further confounding the problem.

We have discovered that thick multilayer dielectric optical filters, particularly multi-cavity bandpass filters, can be removed from the substrate in the form of a free standing film and that the removal affects a significant reduction in stress. Once removed from the substrate, the high intrinsic internal stress of the filter is relieved. The detrimental effects of a high net stress that previously limited the optical performance of multilayer dielectric bandpass filters in many critical applications no longer limits the filters optical design or requires a compromise in device size.

FIG. 3 is the transmission of filter in FIGS. 1 and 2, but after fabricated by first removing the optical thin film layers from the original substrate then reattaching it to another glass substrate to 1.5 mm square by 1 mm thick. The nearly square shape of the passband region has been partly restored, to that in FIG. 1, thus better approximating the ideal or theoretical shape than in FIG. 2.

Elimination of the original substrate aids in the miniaturization of devices and can improve the device optical performance by eliminating the spatial variation in center wavelength across the filter. Despite these and other advantages of a free standing multilayer dielectric bandpass filter, the high thermal variation of center wavelength makes such a structure device generally unsuitable for high performance applications such as in telecom WDM systems. The variation of the optical performance with temperature is significant, and would be unacceptable for WDM applications if the packaged optical components were not thermally stabilized. Specifically such unsupported freestanding filters exhibit a high variability in center wavelength as a function of temperature, making it unsuitable for many telecommunications applications.

Method of Forming a Free Standing Filter

The filter is fabricated by conventional methods using a suitable substrate. However, before the deposition of the multilayer bandpass filter, the substrate is treated to minimize the adhesion between it and the thin film layers that form the bandpass filter, thus permitting facile release of the filter. The means for such release can be a thin film of some material which will defoliate from either the substrate or thin film layers such that the entire bandpass filter delaminates at a desired later point in the fabrication process. Alternatively, the existing substrate can be damaged or attacked such that it is rendered soluble or otherwise will have a low cohesive strength with the underlying undamaged substrate.

Figure 4:
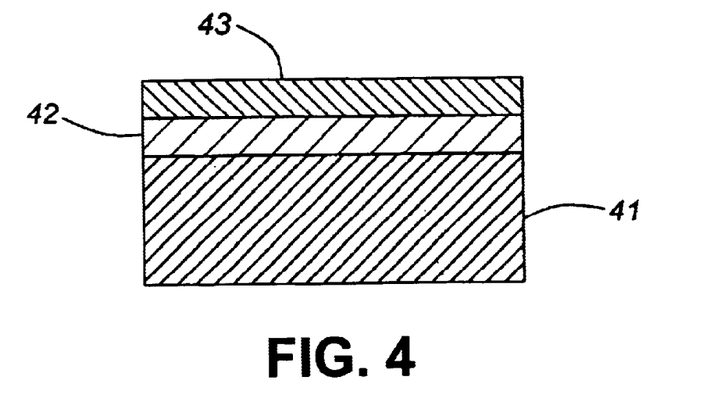
FIG. 4 is a schematic illustration of a section of the substrate and associated release and protective layers, onto which the multilayer bandpass filter is subsequently deposited.

As illustrated in FIG. 4, the present, release means is to deposit a thin layer 42 of a water-soluble material, preferably an inorganic material. We now employ sodium chloride (NaCl) as the release layer, although other suitable materials are disclosed in the art. This release layer 42 is deposited in a vacuum chamber optimized for that operation. Because water-soluble release materials are environmentally fragile with respect to atmospheric humidity, the release layer 42 is preferably protected from the atmospheric environment by depositing thin protective layers 43 over it. As this layer or layers will separate for the release layer 42 and becomes part or all of the first layer of the final multilayer dielectric bandpass filter, its thickness is controlled accordingly, although it should be at least about 100 nm thick. The sodium chloride layer thickness is preferably between about 10 to 20 nm.

The purpose of the protective layer(s) 43 is (are) to isolate the potentially environmentally fragile release layer 42 from atmospheric degradation while awaiting use in the filter deposition system.

The substrate 41, prepared with the release layer structure 42, is then introduced into a conventional deposition system suitable for the production of dielectric multilayer filters of the quality required for the intended application. The multilayer dielectric filter is deposited in the usual way, using accepted Physical Vapor Deposition (PVD) or Chemical Vapor Deposition (CVD) or hybrid PVD/CVD methods.

If desired, the coated substrate may be treated to facilitate later processing of the released filter structure. Such processing may include for example the patterning of the filter. While not an essential element of the invention, this patterning can aid in subsequent processing of the released filter material by providing for identifying features or allowing the filter material to come away from its substrate in pieces of a predetermined size and shaped pieces. Such pieces are not only easier to handle, but can be designed for further mounting or integration into other optical components.

Another method of producing suitably dimensioned free standing thin film filters is to pre-patterning the substrate before deposition of the optical filter, effecting the same result.

Although practically any material that interferes with the adhesion of the substrate and the subsequently deposited thin film will function in the manner of a release layer, a preferred release layer is readily activated by some specific means to remove the multilayer dielectric bandpass filter from its temporary substrate in a controlled and predictable fashion, removing the filter layers completely without introducing cracks, crazes or other defects.

Thus for NaCl a currently preferred release method is to deeply scratch a region of the coating to form a small, deep groove therein. This initiates a delamination front at the groove that then propagates in the release layer to free the filter from the substrate. Depending on the filter design and degree of residual stress, this delamination front can progress slowly over the surface, or it may proceed quite suddenly.

The released bandpass filter now exists as pieces, large enough to be handled by conventional means (such as tweezers). The filter can be further cut to desired size and shape. It can be washed in a suitable solvent (for the case of NaCl, one can use de-ionized water) to remove any remaining residue of the release layer.

Additionally, the filter may be annealed as appropriate to stabilize its optical performance, either before or after release from the substrate.

Alternative release layers may be formed from water-soluble materials, such as other salts, for example metal halides salts (particularly silver chloride), water-soluble polymers, and the like. Other means of release are organic photoresist type materials (susceptible to either attack or dissolution by organic solvents), and thin metal layers (susceptible to either attack or dissolution by reaction with acids, or even bases) and the like.

Method of Thermal Stabilization

We have also discovered means for improving the thermal stability of such freestanding filter without reintroducing an undesirable level of stress. A second substrate may be selected to impart the requisite thermal stability and/or simplify further handling or assembly methods.

Thus in another embodiment of the invention the freestanding filter is removed from the first substrate and attached to a second substrate. The second substrate can be selected from optical glasses having a relatively large coefficient of thermal expansion, such as those previously designed for direct deposition. Suitable substrates for reattachment may be selected on the same basis as taught by Takahashi, supra It should be noted that most thin film materials have a coefficient of thermal expansion (CTE) significantly less than the optimum substrate for thermal stabilization. Silica glass can be considered representative of a thin film material, having a CTE $4.5 \times 10^{-7}/°$ K, while glasses developed for WDM filters have a CTE of between about 50 and $115 \times 10^{-7}/°$ K. In some cases silicon may provide sufficient thermal stabilization, as it has a higher CTE than silica glass $26 \times 10^{-7}/°$ K.

Attachment to Optical Components

Once released from the substrate the unsupported film can be reattached to a second substrate. The second substrate can be another optical component to provide the desired integration by miniaturization as well as combination with other passive or active optical components, such as GRIN lenses, prisms, reflectors, detectors, photodiodes, waveguides, lasers, modulators and the like. Alternatively, the attachment of such free standing filters to at least a portion of precision armature can be used to form reflective element in compact optical switches, such as are disclosed in PCT application WO/0039626 entitled "Wavelength Selective Optical Switch" (Scobey et al.), which is incorporated herein by reference.

Potential methods of reattachment include mechanical coupling as well as adhesive bonding, which can be direct depending on the chemical affinity of the materials; or through an intermediate adhesive layer, such as well known optical adhesives. Those skilled in the art of optical fabrication will recognize a myriad number of attachment methods are feasible. Optical contacting methods, such as those described in U.S. Pat. No. 5,846,638 and 5,441,803 to Meissner or in U.S. Pat. No. 5,485,540 to Eda are particularly desirable as they avoid the use of an intermediate adhesive layer, and as such are incorporated herein by reference.

Attachment to a Supporting Frame Member

Figure 6:
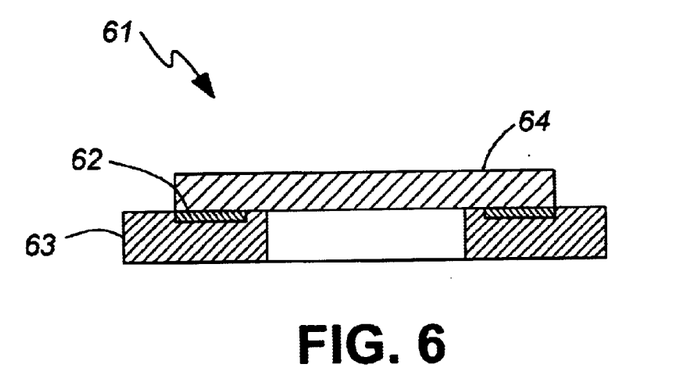
FIG. 6 is a schematic illustration of a freestanding filter that is bonded to a frame at its outer periphery.

We discovered that the free standing film need be not completely re-attached to another optical substrate to reduce or eliminate the thermal shift of the center wavelength position. As schematically illustrated in FIG. 6 the free standing filter 64 can be thermal stabilized by forming a subassembly 61 wherein filter 64 is attached to a frame member 63 having at least one planar surface at the periphery of the filter such that an unsupported portion of the filter spans the opening in the frame to form an optical aperture. As the diameter of the frame opening will expand with heating, this geometry provides the same benefits as a high thermal expansion glass bonded to the entire surface of the filter.

Figure 5:
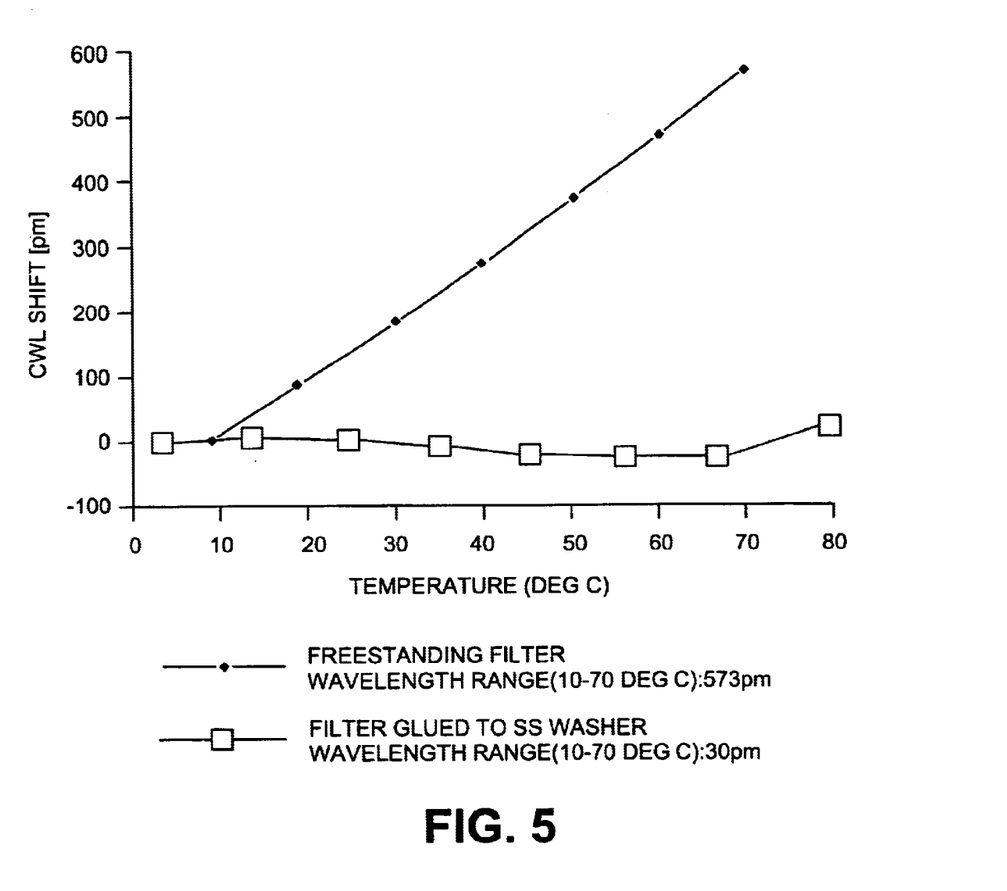
FIG. 5 is a plot of the center wavelength position of the bandpass versus temperature comparing an un-bonded free standing filter with freestanding filter that is bonded to an annular frame at its outer periphery. The un-bonded multilayer dielectric bandpass filter has center wavelength shift of greater than 9 pm/° C. while the peripherally bonded filter center wavelength shifts less than 0.5 pm/° C.

FIG. 5 is a plot of the center wavelength position of the bandpass versus temperature comparing an un-bonded free standing filter with freestanding filter that is bonded to an annular frame at its outer periphery. The un-bonded multilayer dielectric bandpass filter has center wavelength shift of greater than 9 pm/° C. while the peripherally bonded filter center wavelength shifts less than 0.5 pm/° C.

One method of forming subassembly 61 is to remove a suitably dimensioned bandpass filter from its substrate to relieve the net residual stress. The filter 64 is then attached to frame 63 or washer using a suitable high strength adhesive 62, such as an epoxy. As only the outer periphery of the filter is attached to the frame 63 or annular ring, it is preferable to apply the adhesive material to only the planar surface of the frame, thus avoiding contamination of the center of the filter element which remains freestanding. Alternatively, coatings of solder, other bonding agents or adhesive material may be deposited on the planar surface of the frame, or even formed on the surface of the filter 64 in a pattern corresponding to the shape of the frame member. Other methods of attachment include wafer bonding, optical contacting, mechanical coupling and the like. Mechanical coupling may be accomplished by either fitting filter into a sized depression on the frame or connecting a third member for connecting the filter with the frame by compression or friction. The frame need not be an isolated component but may be formed in another portion of an optical component to accomplish further device miniaturization.

The frame is preferably an annular ring, such as a washer, having a suitable thermal expansion coefficient to stabilize the center wavelength of the filter over a wide temperature range. At the same time, the passband retains the desired square shape due to the elimination of residual stress in the coating and the resulting distortion of the first substrate.

The annular ring of the appropriate size for the intended application is selected. The ring is composed of a material with required environmental stability and with a coefficient of thermal expansion, $\alpha$ chosen such that the finished composite device has the required balance between the filter's own intrinsic d (CWL)/d T and the externally imposed stretching provided by the ring's larger value of $\alpha$. While ceramics and optical glasses can be used, a preferred type of frame for such a freestanding filter is a metallic annular ring, such as an ordinary washer. The large differential thermal expansion of the metal ring, relative to the metal oxides in the thin film layers, stretches the filter to balance the intrinsic CWL shift of the filter. Stainless steel is a particularly preferred material, as the grade may be selected for its CTE, which span and exceed the range of the preferred optical glasses for WDM. For example grade SS 410 has a CTE of $103 \times 10^{-7}$ while grade SS 302 has a CTE of $179 \times 10^{-7}/° K$.

Alternatively, before releasing the filter from its temporary substrate, the appropriately chosen frame may be affixed without permanently bonding to the surface of the coating. For example, such frames may be coated with a thermoplastic or thermoset resin, such as a moderately viscous epoxy. At this point, the release layer is activated, freeing the filter from its substrate and confining a selected region thereof to the associated frame element. Each filter can then be permanently bonded to the frame by subsequently curing the adhesive. This method is preferred for its compatibility with high volume production as an assembly of frames detachable from each other in the form of a co-planar array can be simultaneously bonded to remove discretely sized filters. Each discrete free standing film is only temporarily retained in its initial stress state by the viscous force of epoxy, as heating the epoxy to the cure temperature reduces the adhesive viscosity such that the net stress resulting from the substrate is still relieved prior to the permanent attachment necessary for filter stabilization.

Such a frame assembly provides a degree of manufacturing ease for further handling and quality assurance steps since one does not have to individually handle the still delicate free standing filter elements. For example, subsequent disassembly of co-planar array produces a large number of discrete filter/frame subassembly, and can be carried out sequentially wherein a discrete filter/frame subassembly is removed at the time is incorporated into a larger optical component.

Figure 7:
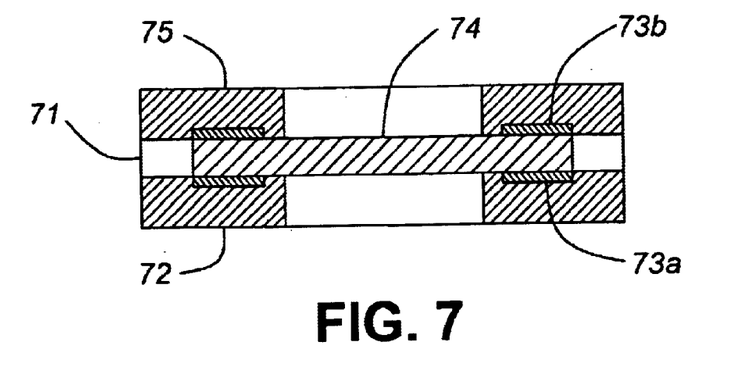
FIG. 7 is a schematic illustration of a freestanding filter that is laminated between two frames; each frame is adhesively bonded to opposing outer surface of the filter at the periphery thereof.

As FIG. 6 is intended to be representative rather than limiting, it should be pointed out that a symmetric thermal stress loaded structure may be desirable in some application, accordingly a second frame member can be attached or bonded to other opposite surface of the filter to form the laminated structure illustrated in FIG. 7. The optical assembly 71 comprises a first frame 72 that is bonded or otherwise attached to the first surface of optical filter 74 via adhesive layer 73a. A second frame 75 is attached to the second surface of optical filter 74 via a second adhesive layer 73b. Alternatively, the second frame 75 can be attached or bonded to both the optical filter 74 and the first frame 72. Attaching or joining the first frame 72 to the second frame 75 can be expected to clamp and functionally attach optical 74, eliminating the dependence on adhesives 736a and/or 73b.

Figure 8:
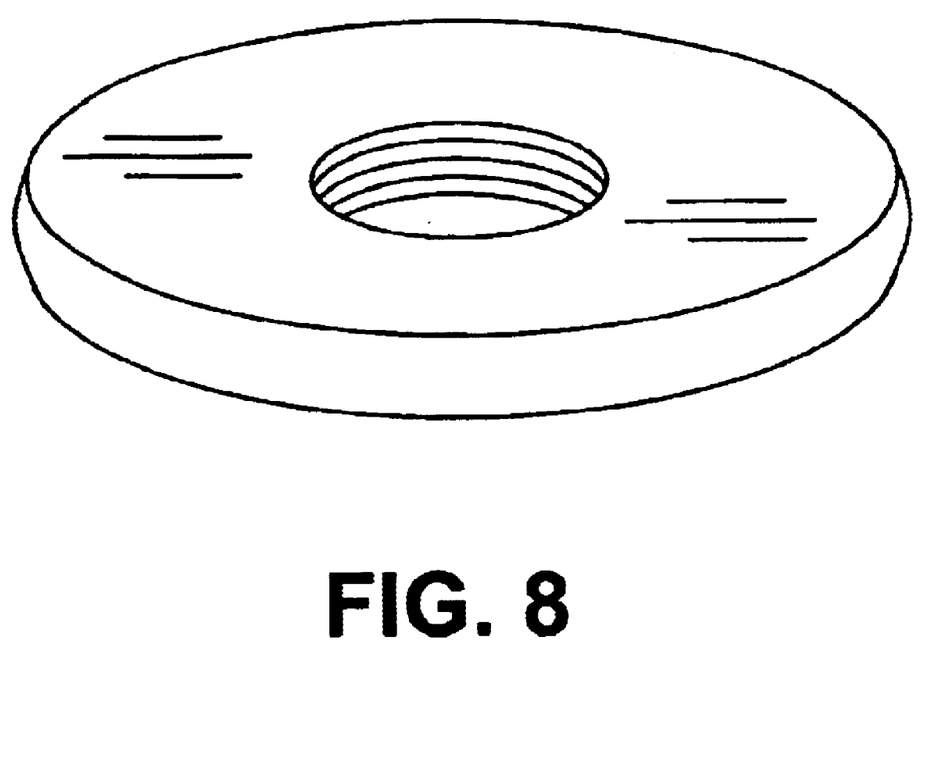
FIG. 8 is a perspective view of freestanding multilayer dielectric filter that is bonded to an annular frame at its outer periphery.

FIG. 8 is a perspective view of freestanding multilayer dielectric filter that is bonded to an annular frame at its outer periphery.

A further advantage of frame/filter subassembly of FIGS. 6 and 7 and is that the elimination of the substrate also avoids Fresnel reflections from the second surface of the substrate (the surface opposite the first surface onto which the multilayer interference filter is otherwise deposited or attached). Thus, when the interference coating is not otherwise in contact with another optical surface, the additional cost and complexity of providing a high performance anti-reflection (AR) to the second surface of the substrate is avoided.

Although the present invention has been described in considerable detail with reference to certain preferred embodiments (versions) thereof, other versions are possible, for example it may be desirable to stabilize other spectral characteristics of optical filters, as no limitation to band pass filters is intended Therefore, the spirit and scope of the appended claims should not be limited to the description of the preferred versions contained herein.

We claim:

1. An optical filter assembly comprising:
   a) a first frame member having a first planar surface that substantially surrounds a central opening therein, the first frame member having a first coefficient of thermal expansion, and
   b) a multilayer thin-film interference filter, originally formed on a substrate and released therefrom forming a freestanding filter to eliminate stresses therebetween, having a first surface for passing light therethrough attached to the planar surface of said first frame member to define an unobstructed optical aperture through said multilayer interference filter, the multilayer interference filter having a second coefficient of thermal expansion smaller than the first coefficient of thermal expansion,
   whereby the frame member applies a stress to the multilayer interference filter during changes in temperature, thereby reducing a shift in the center wavelength transmitted by the multilayer interference filter.

2. An optical filter assembly according to claim 1, further comprising a second frame member with a central opening therethrough attached to a second surface of said multilayer interference filter, wherein the optical aperture through said multilayer interference filter is substantially unobstructed.

3. An optical filter assembly according to claim 2, wherein the second frame member and the first frame member are annular.

4. An optical filter assembly according to claim 2, wherein the first and second frame members are comprised of stainless steel material.

5. An optical filter assembly according to claim 2 wherein the first and second frame members are formed from a material having a coefficient of thermal expansion of between $103 \times 10^{-7}/°$ K. and $179 \times 10^7/°$ K.

6. An optical filter assembly according to claim 1, wherein the first frame member is annular.

7. An optical filter assembly according to claim 1, wherein the first frame member is comprised of metal.

8. An optical filter assembly according to claim 1, wherein the first frame member is comprised of stainless steel.

9. An optical filter assembly according to claim wherein the first frame member is formed from a material having a coefficient of thermal expansion of between $103 \times 10^7/°$ K. and $179 \times 10^7/°$ K.

* * * * *

UNITED STATES PATENT AND TRADEMARK OFFICE
CERTIFICATE OF CORRECTION

PATENT NO. : 6,785,052 B2
DATED : August 31, 2004
INVENTOR(S) : Ockenfuss et al.

It is certified that error appears in the above-identified patent and that said Letters Patent is hereby corrected as shown below:

Title page,
Item [54], Title, "STRESS FREE AND THERMALLY STABILIZED DIELECTRIC FIBER" should read -- STRESS FREE AND THERMALLY STABILIZED DIELECTRIC FILTER --.

Column 10,
Line 59, "adhesives 736a" should read -- adhesives 73a --.

Signed and Sealed this

Fourth Day of October, 2005

JON W. DUDAS
*Director of the United States Patent and Trademark Office*